United States Patent
Xiao et al.

(10) Patent No.: US 12,107,301 B1
(45) Date of Patent: Oct. 1, 2024

(54) END COVER ASSEMBLY, ENERGY STORAGE DEVICE, AND ELECTRIC APPARATUS

(71) Applicants: SHENZHEN HITHIUM ENERGY STORAGE TECHNOLOGY CO., LTD, Guangdong (CN); XIAMEN HITHIUM ENERGY STORAGE TECHNOLOGY CO., LTD., Fujian (CN)

(72) Inventors: Hepan Xiao, Guangdong (CN); Jiben Tan, Guangdong (CN)

(73) Assignees: SHENZHEN HITHIUM ENERGY STORAGE TECHNOLOGY CO., LTD, Guangdong (CN); XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/610,274

(22) Filed: Mar. 20, 2024

(30) Foreign Application Priority Data

Jun. 8, 2023 (CN) .......................... 202310673750.4

(51) Int. Cl.
*H01M 50/567* (2021.01)
*H01M 50/15* (2021.01)

(52) U.S. Cl.
CPC ......... *H01M 50/567* (2021.01); *H01M 50/15* (2021.01)

(58) Field of Classification Search
CPC .............................. H01M 50/567; H01M 50/15
See application file for complete search history.

(56) References Cited

U.S. PATENT DOCUMENTS

2012/0052370 A1* 3/2012 Moon .................. H01M 50/55
429/179

FOREIGN PATENT DOCUMENTS

| CN | 102299273 A  | 12/2011 |
| CN | 215911482 U  | 2/2022  |
| CN | 216120657 U  | 3/2022  |
| CN | 216120668 U  | 3/2022  |
| CN | 114447481 A  | 5/2022  |
| CN | 217641564 U  | 10/2022 |

(Continued)

OTHER PUBLICATIONS

The First Office from corresponding Chinese Application No. 202310673750.4, dated Jul. 14, 2023. English translation attached.

(Continued)

*Primary Examiner* — Jane J Rhee

(57) ABSTRACT

The present disclosure provides an end cover assembly, an energy storage device, and an electric apparatus. The end cover assembly includes: a cover plate having a first through hole; a pole including a pole body, the pole body passing through the first through hole and provided with a first thread at an outer peripheral surface of the pole body; an insulator provided on the cover plate and having a second through hole, the second through hole having a hole wall provided with a second thread, the pole body passing through the second through hole, and the first thread being connected to the second thread; an anti-loosening structure including a first anti-loosening portion and a second anti-loosening portion that are engaged with and connected to each other to prevent the insulator from loosening.

6 Claims, 16 Drawing Sheets

(56) References Cited

FOREIGN PATENT DOCUMENTS

| | | |
|---|---|---|
| CN | 218648105 U | 3/2023 |
| CN | 116404326 A | 7/2023 |
| EP | 3537498 A1 | 9/2019 |
| EP | 3943343 A1 | 1/2022 |
| KR | 19980043346 U | 9/1998 |

OTHER PUBLICATIONS

The Second Office from corresponding Chinese Application No. 202310673750.4, dated Aug. 2, 2023. English translation attached.
The Grant Notice from corresponding Chinese Application No. 202310673750.4, dated Aug. 17, 2023. English translation attached.
International Search Report dated Apr. 10, 2024 in International Application No. PCT/CN2024/074390. English translation attached.
Written Opinion of the ISA dated Apr. 10, 2024 in International Application No. PCT/CN2024/074390. English translation attached.

\* cited by examiner

END COVER ASSEMBLY, ENERGY STORAGE DEVICE, AND ELECTRIC APPARATUS

CROSS-REFERENCE TO RELATED APPLICATION

This application claims priority to Chinese Patent Application No. 2023106737504 filed on Jun. 8, 2023, the entire disclosure of which is incorporated herein by reference.

FIELD

The present disclosure relates to the field of energy storage technologies, and more particularly, to an end cover assembly, an energy storage device, and an electric apparatus.

BACKGROUND

In the related art, a positive pole and a negative pole of a battery are assembled through an injection molding overmolding process, which has low efficiency and high cost, and the assembly is complicated, which leads to difficulty in automated assembly. During manufacturing of the battery, an operator needs to wear anti-scald gloves to place products, and thus is prone to be scalded by a machine with a high temperature.

In a high-temperature baking process of a battery cell process, the injection molding overmolded pole tends to move towards an interior of the battery, resulting in easy leakage of an electrolyte due to a reduction in a compression of a sealing ring. When the pole moves towards the interior of the battery, the pole will move into an insulator, resulting in poor welding of a BUSbar.

SUMMARY

Embodiments of the present disclosure provide an end cover assembly, an energy storage device, and an electric apparatus.

According to the embodiments of the present disclosure, the end cover assembly includes a cover plate, a pole, an insulator, and an anti-loosening structure. The cover plate has a first through hole. The pole includes a pole body. The pole body passes through the first through hole and is provided with a first thread at an outer peripheral surface of the pole body. The insulator is provided on the cover plate and has a second through hole. The second through hole has a hole wall provided with a second thread. The pole body passes through the second through hole, and the first thread is connected to the second thread. The anti-loosening structure includes a first anti-loosening portion and a second anti-loosening portion that are engaged with and connected to each other to prevent the insulator from loosening.

According to some embodiments of the present disclosure, an energy storage device includes a battery cell. The battery cell includes the end cover assembly according to any one of the above embodiments.

According to some embodiments of the present disclosure, an electric apparatus includes the above-mentioned energy storage device. The energy storage device is configured to supply power to the electric apparatus.

Additional aspects and advantages of the present disclosure will be given at least in part in the following description, or become apparent at least in part from the following description, or can be learned from practicing of the present disclosure.

BRIEF DESCRIPTION OF THE DRAWINGS

In order to clearly explain technical solutions in embodiments of the present disclosure or in the related art, drawings used in the description of the embodiments or the related art are briefly described below. Obviously, the drawings as described below are merely some embodiments of the present disclosure. Based on these drawings, other drawings may be obtained by those skilled in the art without creative effort.

Figure 1:
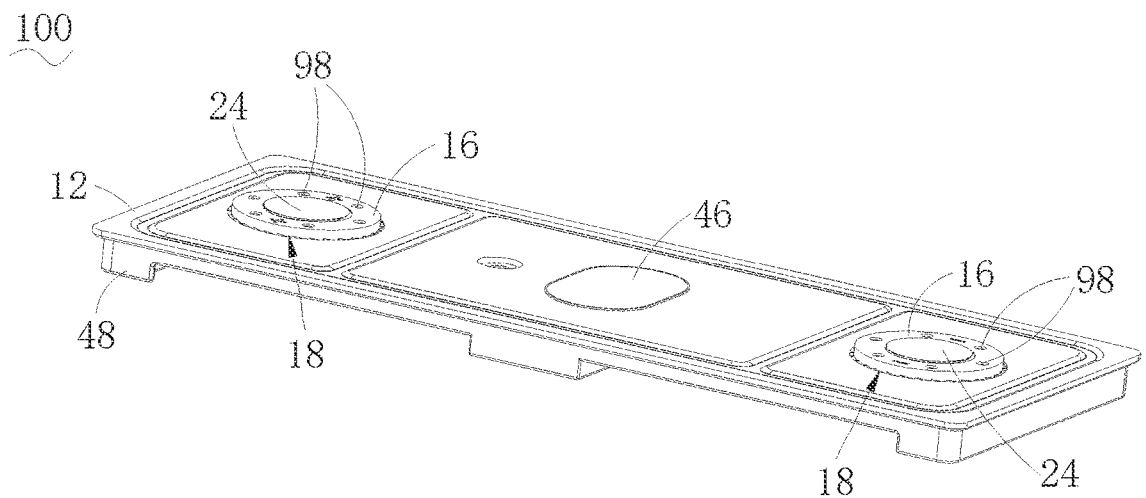
FIG. 1 is a perspective view of an end cover assembly according to an embodiment of the present disclosure.

Reference numerals are as follows:
100, end cover assembly; 12, cover plate; 14, pole; 16, insulator; 18, anti-loosening structure; 20, first through hole; 24, pole body; 26, first thread; 28, second through hole; 30, second thread; 32, first anti-loosening portion; 34, second anti-loosening portion; 36, first surface; 38, second surface; 40, base; 42, negative block; 44, negative welding ring; 46, explosion-proof valve; 48, lower plastic member; 50, sealing ring; 51, connection sheet; 52, first sawtooth mechanism; 54, tooth groove; 56, second sawtooth mechanism; 58, tooth; 60, first engagement surface; 62, first guide surface; 64, second engagement surface; 66, second guide surface; 68, accommodation groove; 70, groove; 72, protrusion; 74, engagement groove; 76, elastic sheet; 78, plastic member body; 80, plastic member flange; 82, third through hole; 84, engagement portion; 86, first side surface; 88, second side surface; 89, edge portion; 90, third surface; 92, fourth surface; 94, hook; 96, hooking portion; 98, fastening hole; 99, operating hole.

DETAILED DESCRIPTION

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

In the description of the present disclosure, it should be understood that the orientation or position relationship indicated by the terms "center", "longitudinal", "lateral", "length", "width", "thickness", "over", "below", "front", "rear", "left", "right", "vertical", "horizontal", "top", "bottom", "inner", "outer", "clockwise", and "anti-clockwise" should be construed to refer to the orientation and the position as shown in the drawings, and is only for the convenience of describing the embodiments of the present disclosure and simplifying the description, rather than indicating or implying that the pointed device or element must have a specific orientation, or be constructed and operated in a specific orientation, and therefore cannot be understood as a limitation of the present disclosure. In addition, the features associated with "first" and "second" can explicitly or implicitly include one or more of the features. In the description of the present disclosure, "plurality" means at least two, unless otherwise specifically defined.

In the description of the embodiments of the present disclosure, unless otherwise clearly specified and limited, it should be understood that terms such as "install", "connect", "connect to", and the like should be understood in a broad sense. For example, it can be a fixed connection or a detachable connection or connection as one piece; mechanical connection or electrical connection; direct connection or indirect connection through an intermediate; internal communication of two components or the interaction relationship between two components. For those skilled in the art, the specific meaning of the above-mentioned terms in the embodiments of the present disclosure can be understood according to specific circumstances. The specific embodiments described herein are only used to explain, rather than to limit, the present disclosure.

In the present disclosure, unless expressly stipulated and defined otherwise, the first feature "on" or "under" the second feature can mean that the first feature is in direct contact with the second feature, or the first feature and the second feature are not in direct contact but are in contact through another feature between them. Moreover, the first feature "above" the second feature can mean that the first feature is directly above or obliquely above the second feature, or simply mean that the level of the first feature is higher than that of the second feature. The first feature "below" the second feature can mean that the first feature is directly below or obliquely below the second feature, or simply mean that the level of the first feature is smaller than that of the second feature.

A number of embodiments or examples are provided in the disclosure of the present disclosure to implement different structures of the present disclosure. To simplify the disclosure of the present disclosure, components and arrangements of particular examples will be described below, which are, of course, examples only and are not intended to limit the present disclosure. Furthermore, reference numerals and/or reference letters can be repeated in different examples of the present disclosure. Such repetition is for the purpose of simplicity and clarity and does not indicate any relationship between various embodiments and/or arrangements in question. In addition, various examples of specific processes and materials are provided in the present disclosure. However, those of ordinary skill in the art can be aware of applications of other processes and/or the use of other materials.

Figure 2:
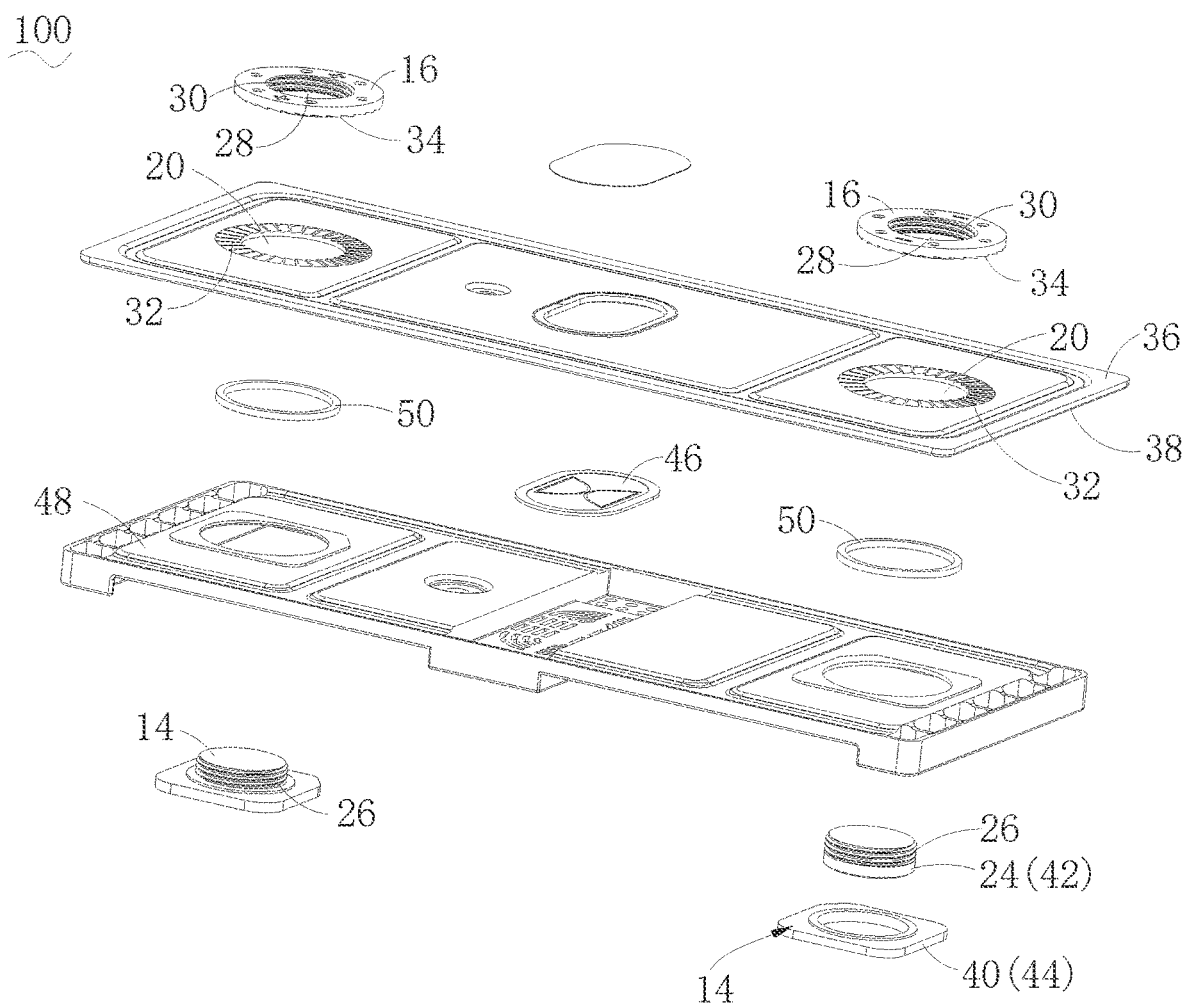
FIG. 2 is an exploded view of an end cover assembly according to an embodiment of the present disclosure.

Referring to FIG. 1 and FIG. 2, an end cover assembly 100 according to an embodiment of the present disclosure includes a cover plate 12, a pole 14, an insulator 16, and an anti-loosening structure 18. The cover plate 12 has a first through hole 20. The pole 14 includes a pole body 24. The pole body 24 passes through the first through hole 20, and is provided with a first thread 26 at an outer peripheral surface of the pole body 24. The insulator 16 is provided on the cover plate 12 and has a second through hole 28. The second through hole 28 has a hole wall provided with a second thread 30. The pole body 24 passes through the second through hole 28. The first thread 26 is connected to the second thread 30. The anti-loosing structure 18 includes a first anti-loosing portion 32 and a second anti-loosing portion 34. The first anti-loosing portion 32 and a second anti-loosing portion 34 are engaged with and connected to each other to prevent the insulator 16 from loosening.

In the above end cover assembly 100, the insulator 16 and the pole body 24 of the pole 16 are connected to the first thread 26 through the second thread 30. Therefore, without an injection molding overmolding process, a movement of the pole 14 towards an interior of a battery can be avoided. In addition, reliability of a connection between the insulator 16 and the pole body 24 of the pole 14 can be ensured by the anti-loosening structure 18.

In an exemplary embodiment of the present disclosure, a material of the cover plate 12 and a shape of the first through hole 20 are not limited in the present disclosure. In an embodiment, the cover plate 12 may be a plain aluminum sheet, and the first through hole 20 may be a circular hole.

The cover plate 12 has a first surface 36 and a second surface 38 opposite to each other. The first through hole 20 penetrates the first surface 36 and the second surface 38. In FIG. 2, the first surface 36 is an upper surface, and the second surface 38 is a lower surface.

The pole 14 further includes a base 40 connected to the pole body 24. The pole 14 may be made of metal. The pole body 24 is of a cylindrical or polygon prism shape, which is not limited herein. In FIG. 2, the pole body 24 is of a cylindrical shape. In an embodiment, referring to FIG. 2, the pole 14 at a right side may be a negative pole. The negative pole consists of a negative block 42 and a negative welding ring 44 that are welded. The negative block 42 and the negative welding ring 44 are connected to each other through laser welding. The negative block 42 may be a composite material of copper and aluminum, and the negative welding ring 44 may be a copper ring. The copper of the negative block 42 and the copper ring are connected to each other through the laser welding, which can ensure connection reliability. The negative block 42 and the negative welding ring 44 are first welded by a laser, and then the first thread 26 is formed at the pole body 24 through a thread rolling process or a turning process. The negative welding ring 44 is formed as the base 40, and the negative block 42 is formed as the pole body 24.

In an embodiment, referring to FIG. 2, the pole 14 at a left side is a positive pole. The positive pole manufacturing process is to form the first thread 26 on the pole body 24 through the thread rolling or the turning after stamping. The positive pole has an integral structure. Parts and components of the pole 14 are manufactured through high-efficiency and low-cost processes, which can reduce cost while lowering difficulty in the automated assembly. Therefore, high-efficiency automated manufacturing can be realized, which reduces manufacturing cost and improves a qualified rate of the product, enabling the whole cost of the end cover assembly 100 to be reduced by about 28%.

The insulator 16 may be an upper plastic member of the end cover assembly 100. The insulator may be an individually injection-molded component rather than an insulator formed by an overmolding process. The insulator 16 may separate the cover plate 12 from the pole 14, and increase a creepage distance between the cover plate 12 and the pole 14, thereby ensuring the safety of the battery cell. The second through hole 28 is a circular hole, and a second thread 30 is formed at a hole wall of the second through hole 28. During mounting, the pole body 24 passes through the first through hole 20 and protrudes from the cover plate 12. The insulator 16 may be mounted to the pole body 24 from a position above the cover plate 12, and then the insulator 16 rotates clockwise (in a tightening direction). The second thread 30 engages with the first thread 26 to allow the insulator 16 to screw into the pole body 24. When the insulator 16 is mounted in place, the first anti-loosing portion 32 and the second anti-loosing portion 34 may be engaged and connected to each other to prevent the insulator 16 from loosening. For example, the first anti-loosing portion 32 and the second anti-loosing portion 34 can prevent the insulator 16 from rotating counterclockwise (in a loosening direction), thereby ensuring the connection reliability between the insulator 16 and the pole body 24.

The end cover assembly 100 further includes an explosion-proof valve 46, a lower plastic member 48, a sealing ring 50, and a connection sheet 51. The lower plastic member 48 is connected to a lower surface of the cover plate 12, and the explosion-proof valve 46 is mounted at the cover plate 12. The sealing ring 50 is arranged around the pole body 24. The base 40 of the pole 14 is pressed against the lower surface of the cover plate 12. The connection sheet 51 is connected to an end of the pole.

In some embodiments, the first anti-loosening portion 32 is disposed at the cover plate 12. The second anti-loosening portion 34 is disposed at the insulator 16.

In this way, the first anti-loosening portion 32 limits the insulator 16 above the cover plate 12. Meanwhile, since the insulator 16 and the pole 14 are connected to each other by the thread, the insulator 16 cannot loosen.

In an exemplary embodiment of the present disclosure, unlike the cover plate 12, the insulator 16 is a separate component, and the insulator 16 as a separate component is connected to the pole 14 by the thread. When assembling battery cells, the end cover assembly 100 is mounted at an opening at a side of a housing, and the cover plate 12 is fixedly connected to the housing. The first anti-loosening portion 32 is provided at the cover plate 12, and the second anti-loosening portion 34 is provided at the insulator 16. Therefore, the insulator 16 has a high anti-loosening performance.

In another exemplary embodiment of the present disclosure, the first anti-loosening portion 32 may be connected to the cover plate 12 and formed into an integral structure with the cover plate 12. The second anti-loosening portion 34 may be connected to the insulator 16 and formed into an integral structure with the insulator. Therefore, an anti-loosening effect can be achieved.

In some embodiments, referring to FIG. 5 to FIG. 12, the first anti-loosening portion 32 includes a first sawtooth mechanism 52. The first sawtooth mechanism 52 includes a plurality of tooth grooves 54 circumferentially arranged around the pole body 24. The second anti-loosening portion 34 includes a second sawtooth mechanism 56. The second sawtooth mechanism 56 includes a plurality of tooth 58 circumferentially arranged around the insulator 16. Each of the plurality of tooth 58 is received in one of the tooth plurality of tooth grooves 54 to prevent the insulator 16 from loosening.

In this way, the plurality of tooth 58 is received in the plurality of tooth grooves 54, which can prevent the insulator 16 from loosening by the cover plate 12.

Figure 6:
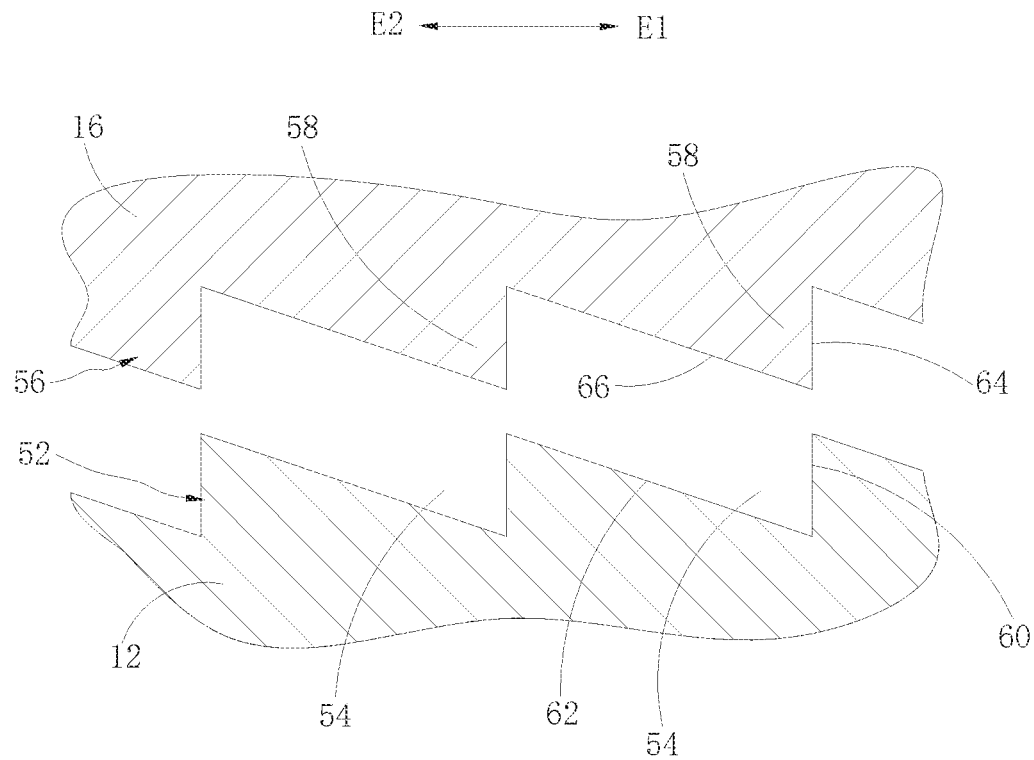
FIG. 6 is a schematic view showing a separation between an insulator and a cover plate according to an embodiment of the present disclosure.
Figure 7:
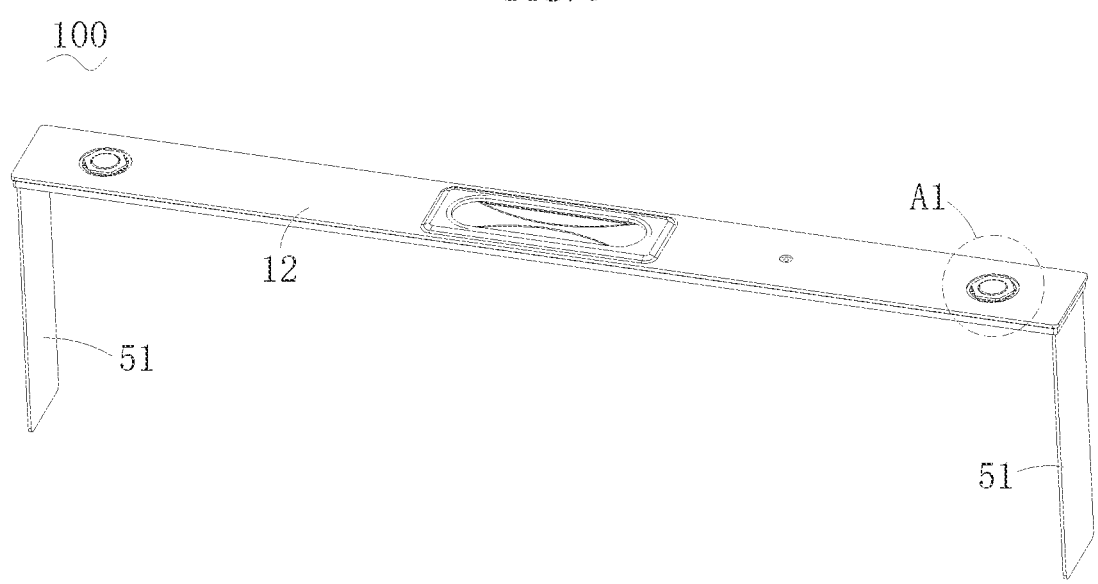
FIG. 7 is another perspective view of an end cover assembly according to an embodiment of the present disclosure.

In an exemplary embodiment of the present disclosure, referring to FIG. 2 and FIG. 6, the first sawtooth mechanism 52 is disposed at an upper surface of the cover plate 12 and surrounds the first through hole 20. The second sawtooth mechanism 56 is disposed at a lower surface of the insulator 16. Referring to FIG. 6, the insulator 16 is mounted downward into the pole body 24 from a position above the cover plate 12 during mounting of the insulator 16 into the pole body 24, and the second sawtooth mechanism 56 gradually moves towards the first sawtooth mechanism 52. When the second sawtooth mechanism 56 is connected to the first sawtooth mechanism 52, the anti-loosening structure 18 does not impede the insulator 16 from rotating clockwise (in a tightening direction). That is, the insulator 16 may continue to rotate clockwise. When the insulator 16 rotates in place, each of the plurality of tooth 58 is received in one of the plurality of tooth grooves 54, thereby preventing the insulator 16 from rotating counterclockwise (in a loosening direction), which in turn preventing the insulator 16 from loosening.

In some embodiments, each of the plurality of tooth grooves 54 includes a first engagement surface 60 and a first guide surface 62. The first engagement surface 60 is connected to the first guide surface 62 and extends in a thickness direction of the cover plate 12. The first guide surface 62 is inclined away from the cover plate 12 from the first engagement surface 60 in a direction perpendicular to the thickness direction of the cover plate 12. Each of the plurality of tooth 58 includes a second engagement surface 64 and a second guide surface 66. The second engagement surface 64 is connected to the second guide surface 66 and extends in the thickness direction of the cover plate 12. The second guide surface 66 is inclined away from the cover plate 12 from the second engagement surface 64 in the direction perpendicular to the thickness of the cover plate 12. The first engagement surface 60 abuts with the second engagement surface 64 to prevent the insulator 16 from loosening. The first guide surface 62 is attached to the second guide surface 66.

In this way, the insulator 16 can be prevented from loosening by abutting the first engagement surface 60 with the second engagement surface 64.

In an exemplary embodiment of the present disclosure, the plurality of tooth grooves 54 is arranged circumferentially around the first through hole 20, and the plurality of tooth 58 is arranged circumferentially around the insulator 16. Each of the plurality of tooth 58 is received in one of the plurality of tooth grooves 54

In FIG. 6, a thickness direction of the cover plate 12 is an up-down direction. The first engagement surface 60 and the second engagement surface 64 extend in the up-down direction. That is, each of the first engagement surface 60 and the second engagement surface 64 is a vertical surface. The first engagement surface 60 abuts with the second engagement surface 64 to prevent the insulator 16 from rotating in an E1 direction (the E1 direction in FIG. 6 corresponds to the counterclockwise direction), thereby preventing the insulator 16 from loosening.

The first guide surface 62 and the second guide surface 66 are both inclined surfaces and parallel to each other. The first guide surface 62 and the second guide surface 66 are attached to each other, allowing the insulator 16 to rotate smoothly in an E2 direction (the E2 direction in FIG. 6 corresponds to the clockwise direction), thereby preventing the insulator 16 from being stuck during a tightening rotation.

Before the insulator 16 rotates in place, the plurality of tooth 58 may be compressed by the first sawtooth mechanism 52 and deformed, which allows the insulator 16 to be tightened smoothly.

Figure 8:
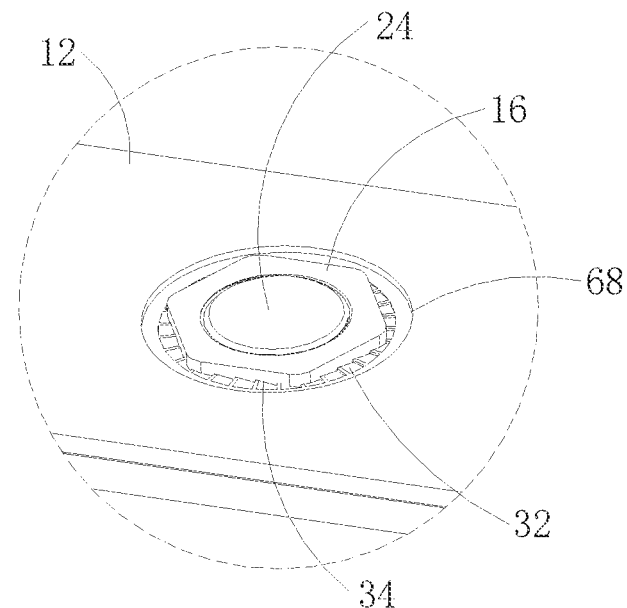
FIG. 8 is an enlarged view showing part A1 of the end cover assembly in FIG. 7.
Figure 9:
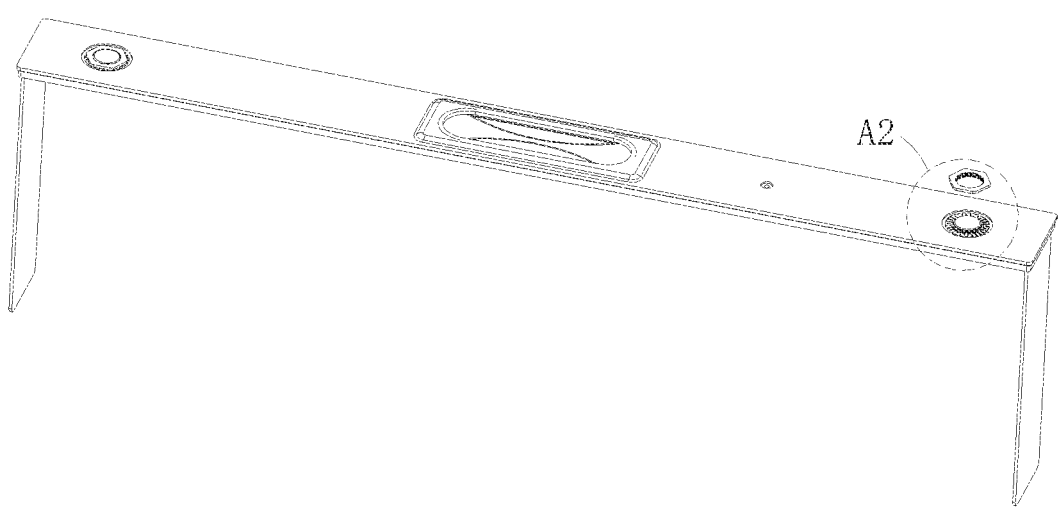
FIG. 9 is another partially exploded view of an end cover assembly according to an embodiment of the present disclosure.
Figure 10:
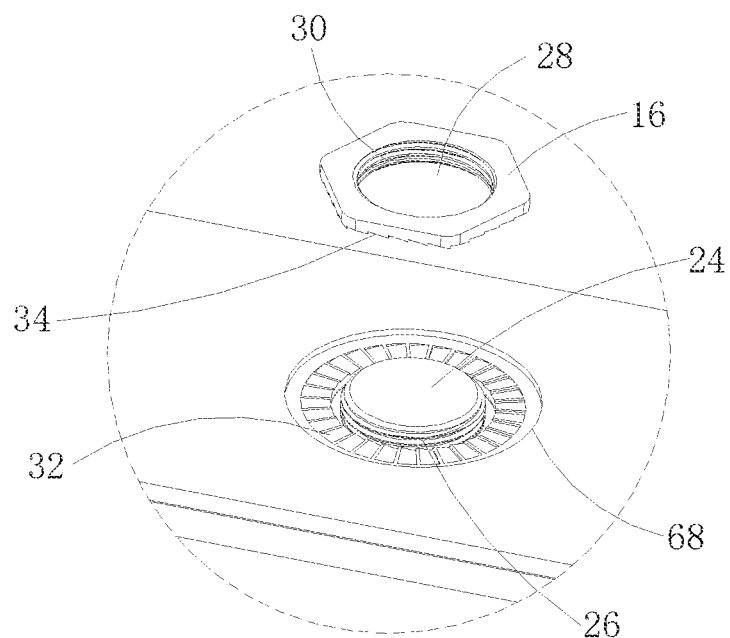
FIG. 10 is an enlarged view showing part A2 of the end cover assembly in FIG. 9.
Figure 11:
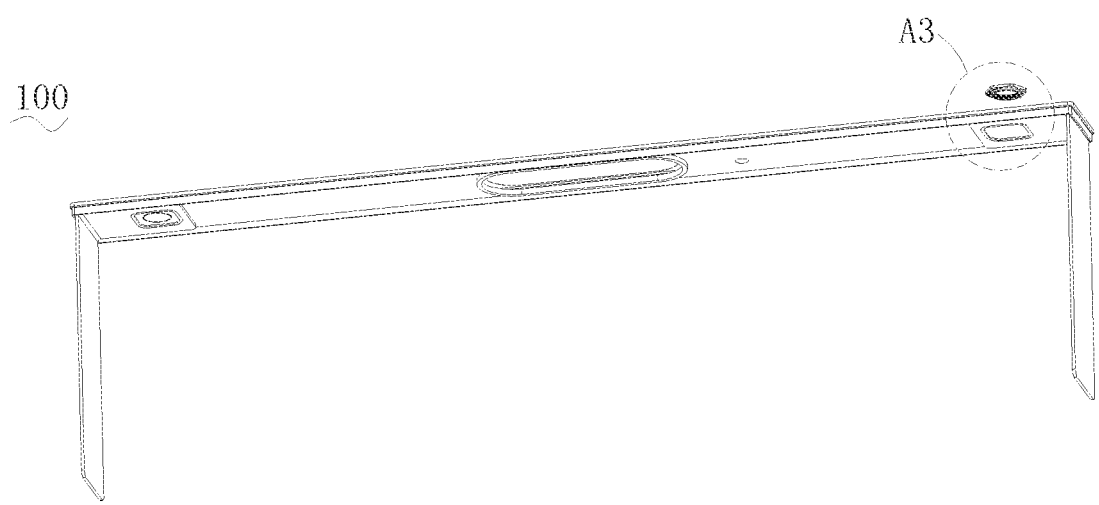
FIG. 11 is another partially exploded view of an end cover assembly according to an embodiment of the present disclosure.
Figure 12:
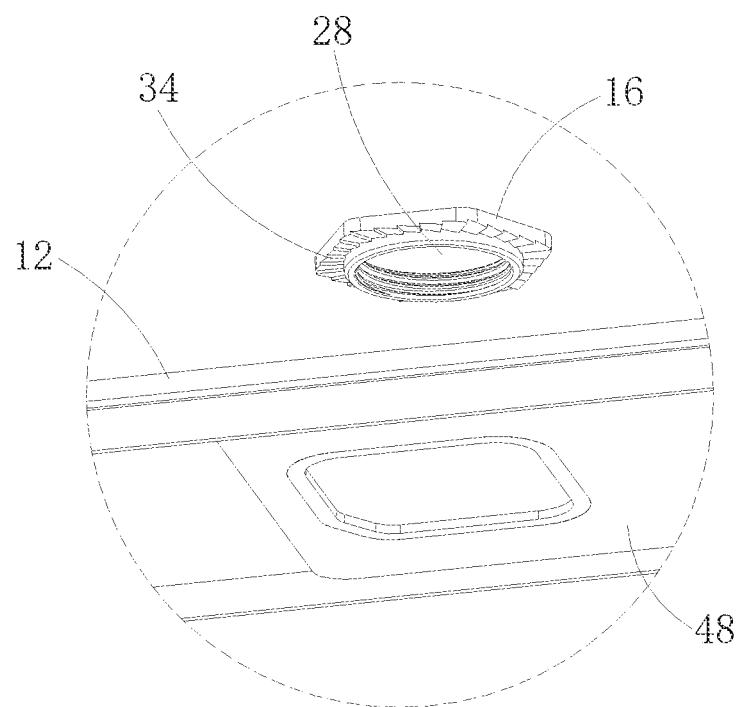
FIG. 12 is an enlarged view showing part A3 of the end cover assembly in FIG. 11.
Figure 13:
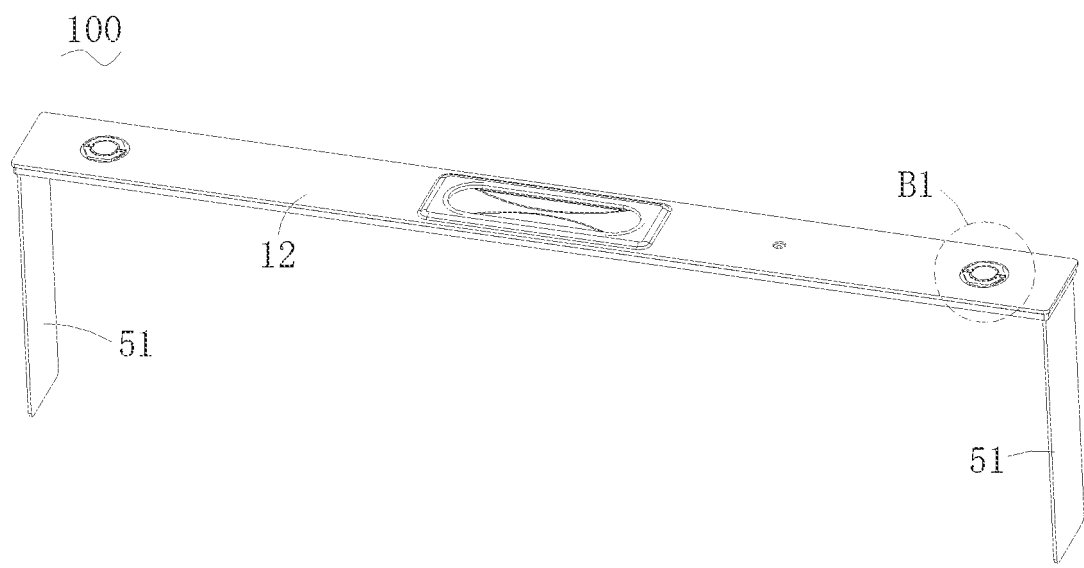
FIG. 13 is another perspective view of an end cover assembly according to an embodiment of the present disclosure.
Figure 14:
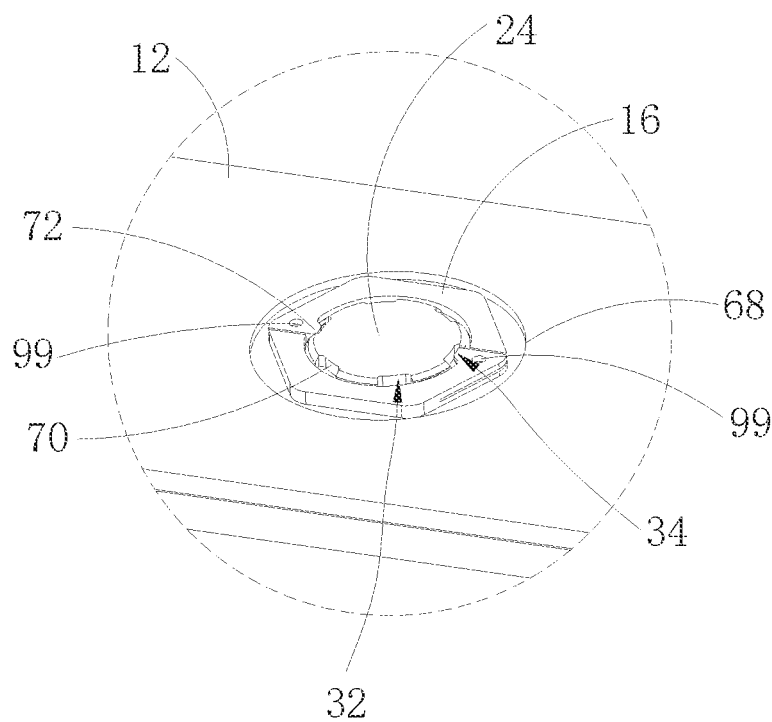
FIG. 14 is an enlarged view showing part B1 of the end cover assembly in FIG. 13.
Figure 15:
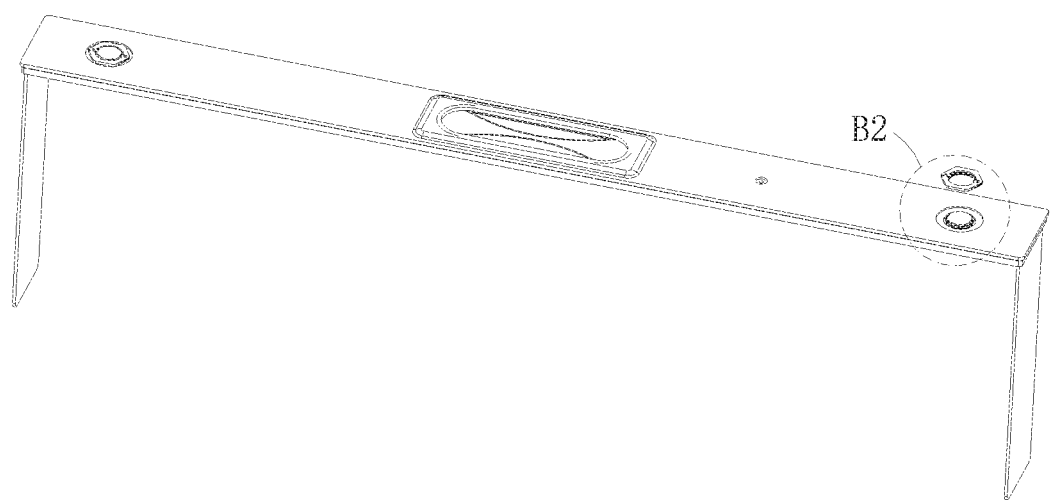
FIG. 15 is another partially exploded view of an end cover assembly according to an embodiment of the present disclosure.
Figure 16:
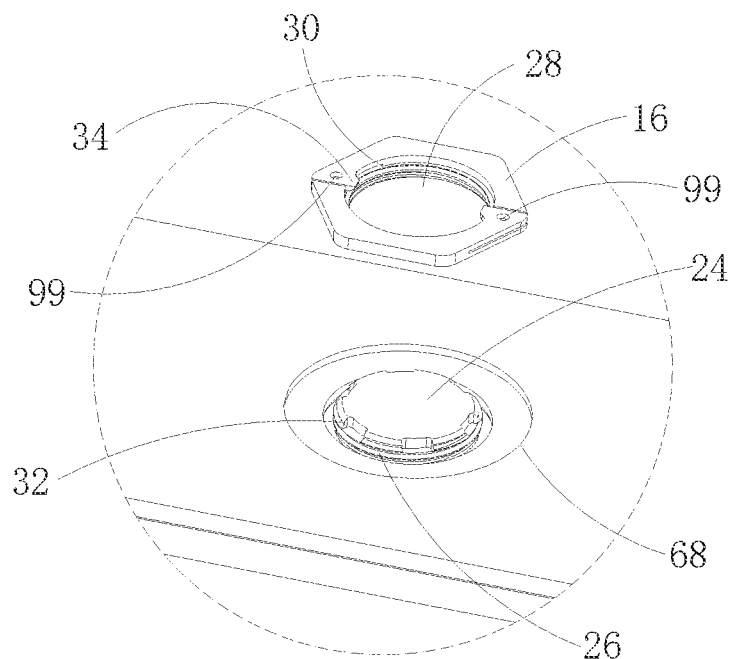
FIG. 16 is an enlarged view showing part B2 of the end cover assembly in FIG. 15.
Figure 17:
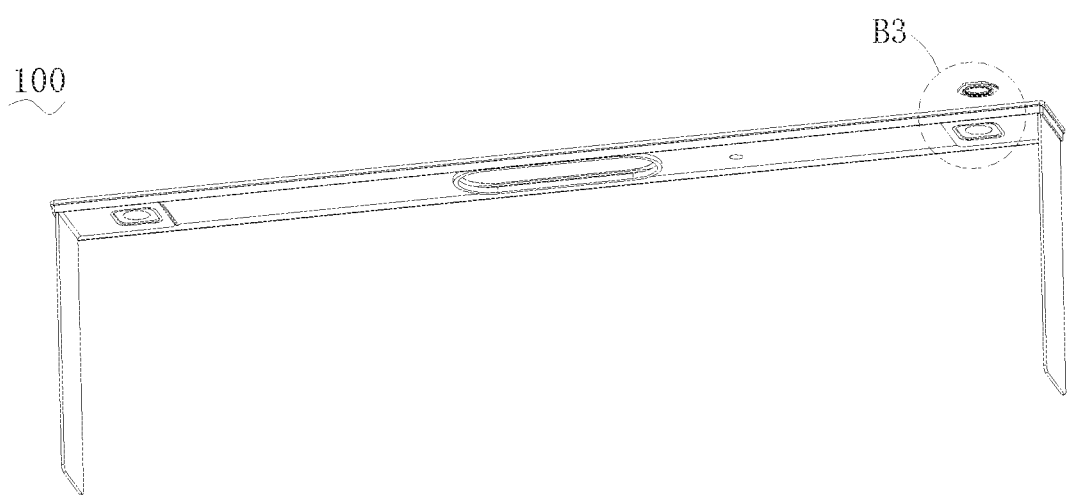
FIG. 17 is another partially exploded view of an end cover assembly according to an embodiment of the present disclosure.
Figure 18:
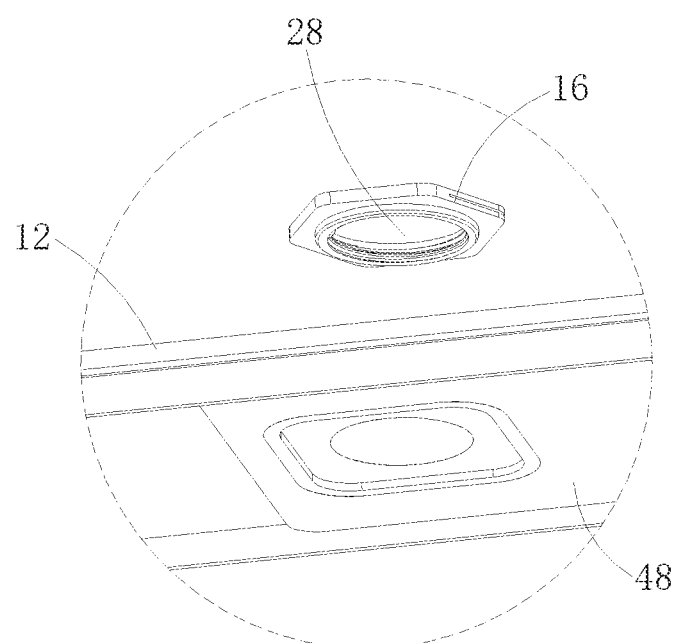
FIG. 18 is an enlarged view showing part B3 of the end cover assembly in FIG. 17.
Figure 19:
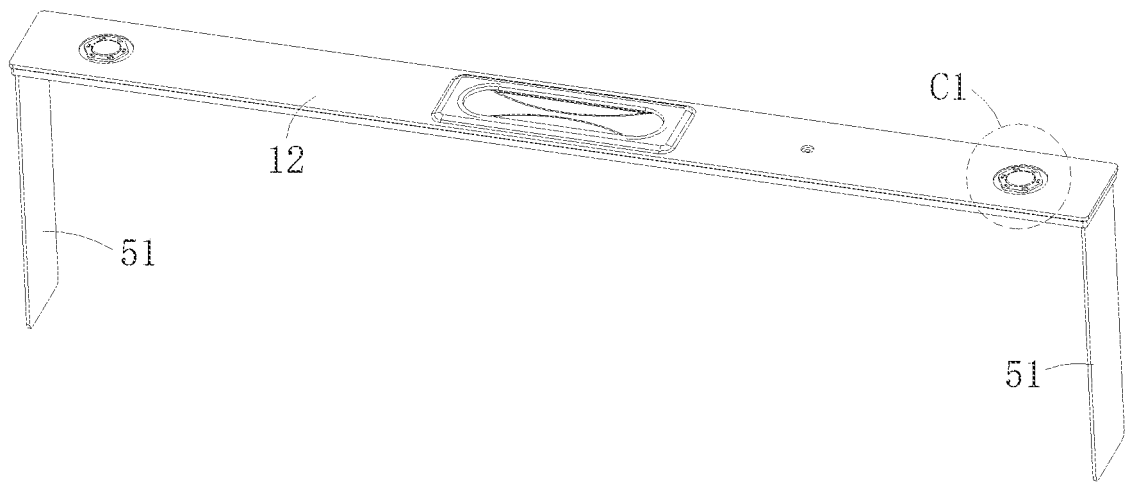
FIG. 19 is another perspective view of an end cover assembly according to an embodiment of the present disclosure.
Figure 20:
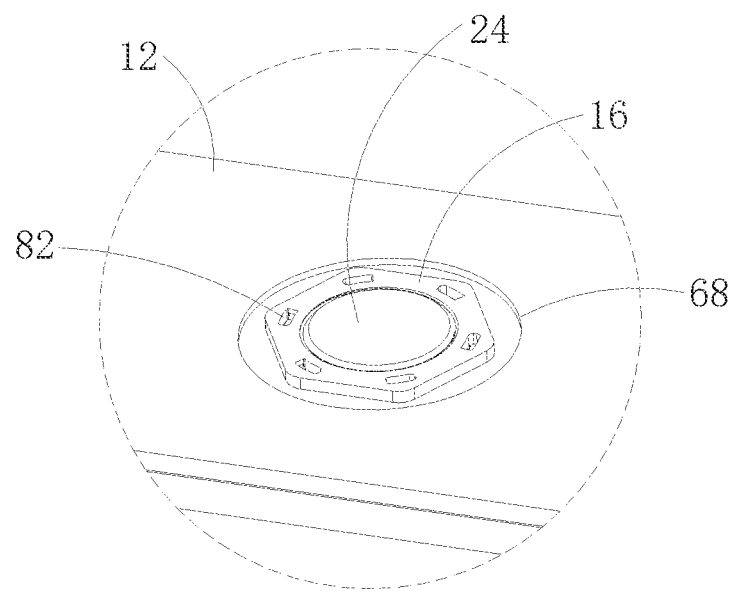
FIG. 20 is an enlarged view showing part C1 of the end cover assembly in FIG. 19.
Figure 21:
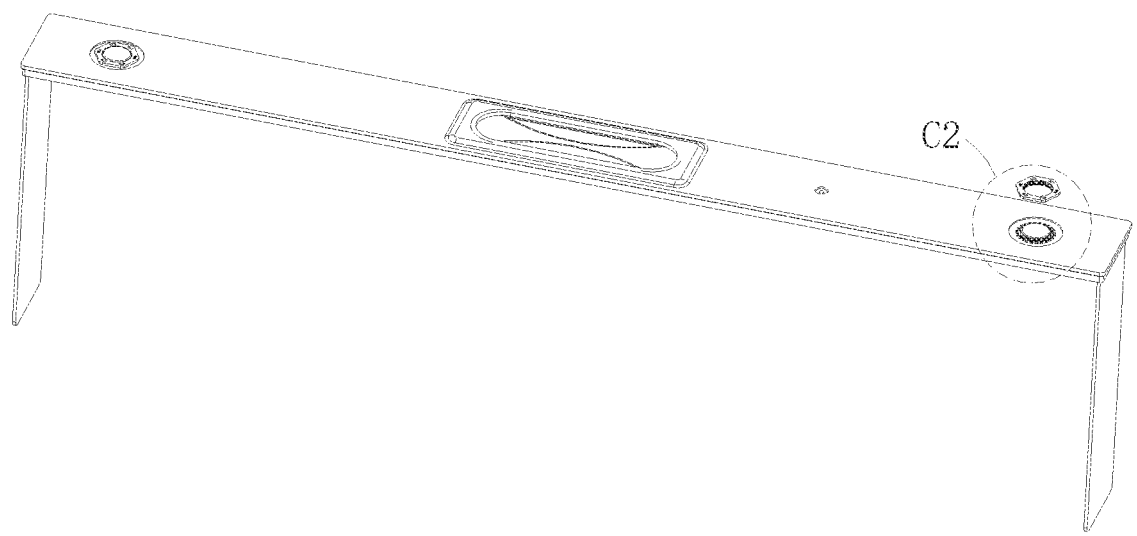
FIG. 21 is another partially exploded view of an end cover assembly according to an embodiment of the present disclosure.

In some embodiments, referring to FIG. 8, FIG. 14, and FIG. 20, the cover plate 12 has an accommodation groove 68 formed at a surface of the cover plate 12. The first through hole 20 is in communication with the accommodation groove 68. The insulator 16 and the pole body 24 are at least partially accommodated in the accommodation groove 68. The first anti-loosening portion 32 is disposed at a bottom surface of the accommodation groove 68.

In this way, a height from an upper surface of the pole 14 to the cover plate 12 can be reduced, thereby increasing a capacity of a battery cell.

In an exemplary embodiment of the present disclosure, the upper surface of the cover plate 12 has an accommodation groove 68. The first through hole 20 passes through the bottom surface of the accommodation groove 68. The pole body 24 is at least partially located in the accommodation groove 68. A distance between the upper surface of the pole 14 and the cover plate 12 is reduced. At the same height of the battery cell, the housing of the battery cell may be made larger, and the housing may accommodate a larger bare battery cell, thereby improving the capacity of the battery cell.

The insulator 16 is at least partially located in the accommodation groove 68, which increases the creepage distance between the pole body 24 and the cover plate 12, allowing the distance between the pole body 24 and the cover plate 12 to meet safety requirements.

In some embodiments, referring to FIG. 13 to FIG. 18, the first anti-loosening portion 32 is disposed at the outer peripheral surface of the pole body 24. The second anti-loosening portion 34 is disposed at the hole wall of the second through hole 28.

In this way, the insulator 16 can be prevented from loosening by the first anti-loosening portion 32 on the pole body 24 and the second anti-loosening portion 34 of the insulator 16.

In an exemplary embodiment of the present disclosure, when assembling the end cover assembly 100, the pole body 24 passes through the first through hole 20 and protrudes from the first through hole 20. The insulator 16 is mounted downward into the pole body 24 from a position above the cover plate 12. When the insulator 16 is mounted in place or is to be mounted in place, the second anti-loosing portion 34 may be engaged and connected with the first anti-loosing portion 32 to prevent the insulator 16 from loosening.

In another exemplary embodiment of the present disclosure, the first anti-loosening portion 32 may be connected to the pole body 24 and formed into an integral structure with the pole body 24, and the second anti-loosening portion 34 may be connected to the insulator 16 and formed into an integral structure with the insulator 16. Therefore, the anti-loosening effect can be enhanced.

In some embodiments, referring to FIG. 13 to FIG. 18, the first anti-loosening portion 32 includes one of a groove 70 and a protrusion 72, and the second anti-loosening portion 34 includes the other one of the groove 70 and the protrusion 72. The protrusion 72 extends in a radial direction of the pole body 24, and is at least partially located in the groove 70 to prevent the insulator 16 from loosening.

In this way, the insulator 16 can be prevented from loosening through the engagement between the groove 70 and the protrusion 72, and thus has high anti-loosening performance.

In an exemplary embodiment of the present disclosure, in FIG. 14, the first anti-loosening portion 32 includes a plurality of grooves 70 arranged at intervals along a top peripheral edge of the pole body 24. The second anti-loosening portion 34 includes a plurality of protrusions 72 arranged at intervals circumferential along the hole wall of the second through hole 28. Each of the plurality of protrusions 72 extends towards the pole body 24 in the radial direction of the pole body 24. The anti-loosening structure 18 may be formed into a ratchet structure to prevent the insulator 16 from loosening.

In another exemplary embodiment of the present disclosure, the number of protrusions 72 may be smaller than the number of grooves 70 in order to allow the insulator 16 to be tightened more smoothly. For example, in FIG. 14, two protrusions 72 and six grooves 70 is provided. The two protrusions 72 are arranged in a radial direction of the second through hole 28, and the six grooves 70 are divided into three groups. The three groups of grooves 70 are evenly arranged circumferentially around the pole body 24, and the two grooves 70 in each of the three groups are arranged in the radial direction of the pole body 24.

Since the insulator 16 has a predetermined deformation recovery ability. After the insulator 16 is tightened, a special tool may be inserted into two operating holes 99 of the insulator 16 to deform outwards the insulator 16, thereby separating the protrusion 72 (having a predetermined elasticity) of the insulator 16 from the groove 70 at the pole body 24. As a result, the pole 14 can be disassembled from the insulator 16 by rotating the insulator 16 in the loosening direction (such as the counterclockwise direction). In the embodiments of the present disclosure, the pole 14 can be disassembled, which reduces scrap cost in the manufacturing process, allowing defective products to be easily recycled and classified and realizing high anti-loosening performance.

It should be appreciated that, in other embodiments, the first anti-loosening portion 32 may include the protrusion 72, and the second anti-loosening portion 34 may include the groove 70. The protrusion 72 extends away from the pole body 24 in the radial direction of the pole body 24.

In some embodiments, referring to FIG. 19 to FIG. 25, the first anti-loosening portion 32 includes one of an engagement groove 74 and an elastic sheet 76. The second anti-loosening portion 34 includes the other one of the engagement groove 74 and the elastic sheet 76. The elastic sheet 76 is at least partially located in the engagement groove 74 to prevent the insulator 16 from loosening.

In this way, the insulator 16 can be prevented from loosening through the engagement between the engagement groove 74 and the elastic sheet 76, and thus has a high anti-loosening performance.

Figure 22:
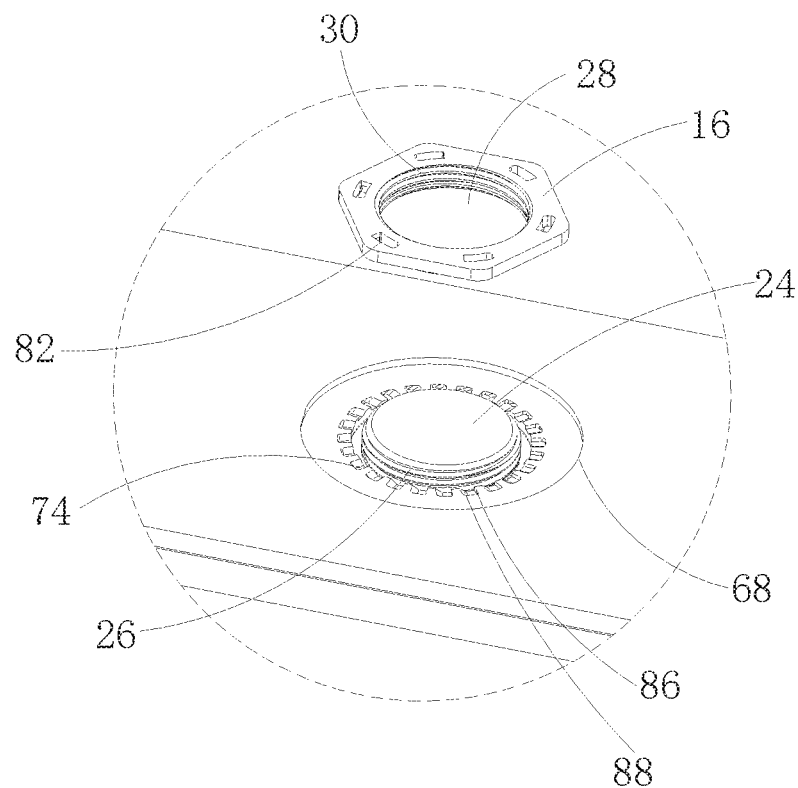
FIG. 22 is an enlarged view showing part C2 of the end cover assembly in FIG. 21.
Figure 23:
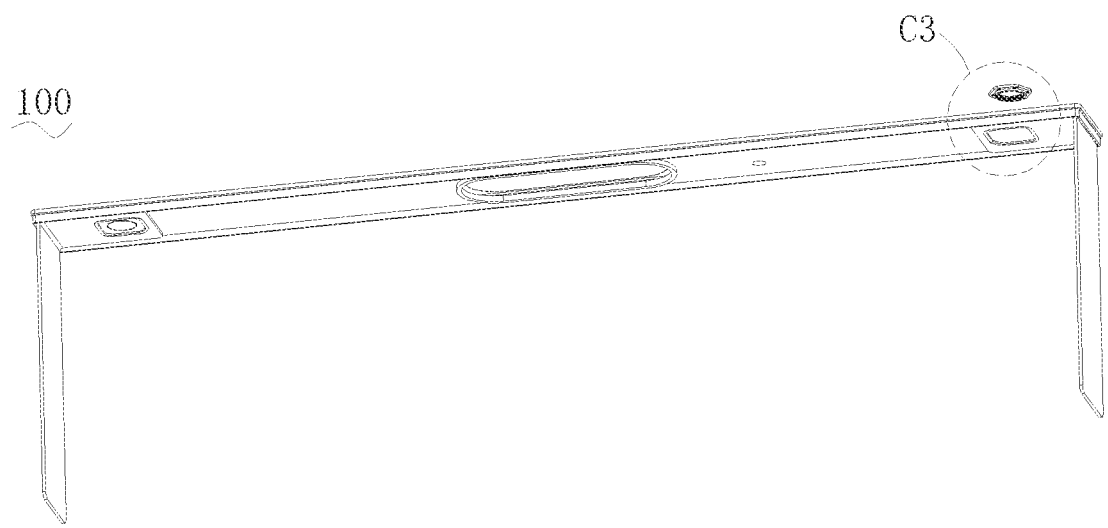
FIG. 23 is another partially exploded view of an end cover assembly according to an embodiment of the present disclosure.
Figure 24:
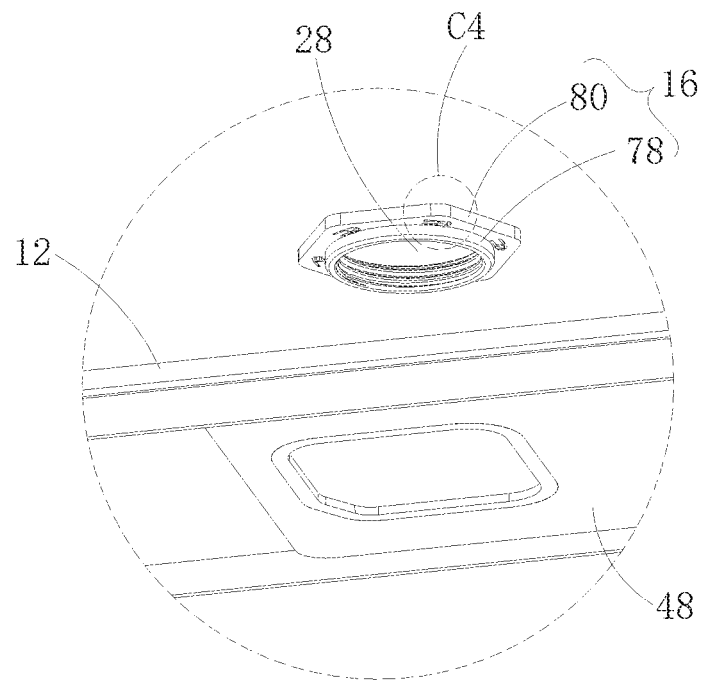
FIG. 24 is an enlarged view showing part C3 of the end cover assembly in FIG. 23.
Figure 25:
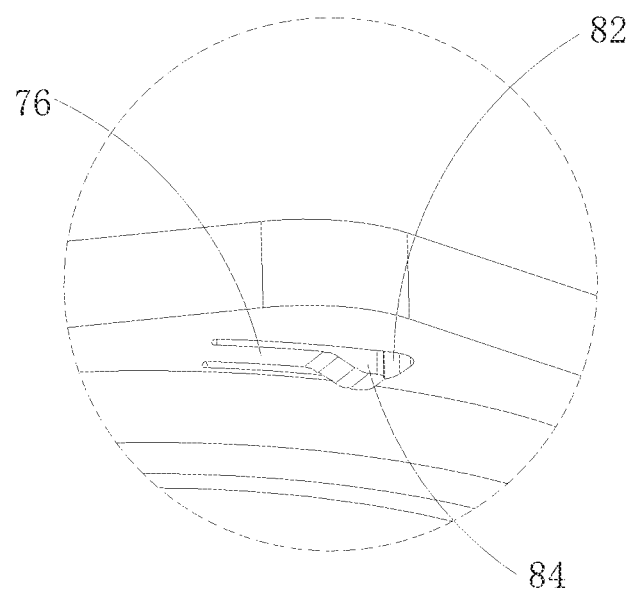
FIG. 25 is an enlarged view showing part C4 of the end cover assembly in FIG. 24.
Figure 26:
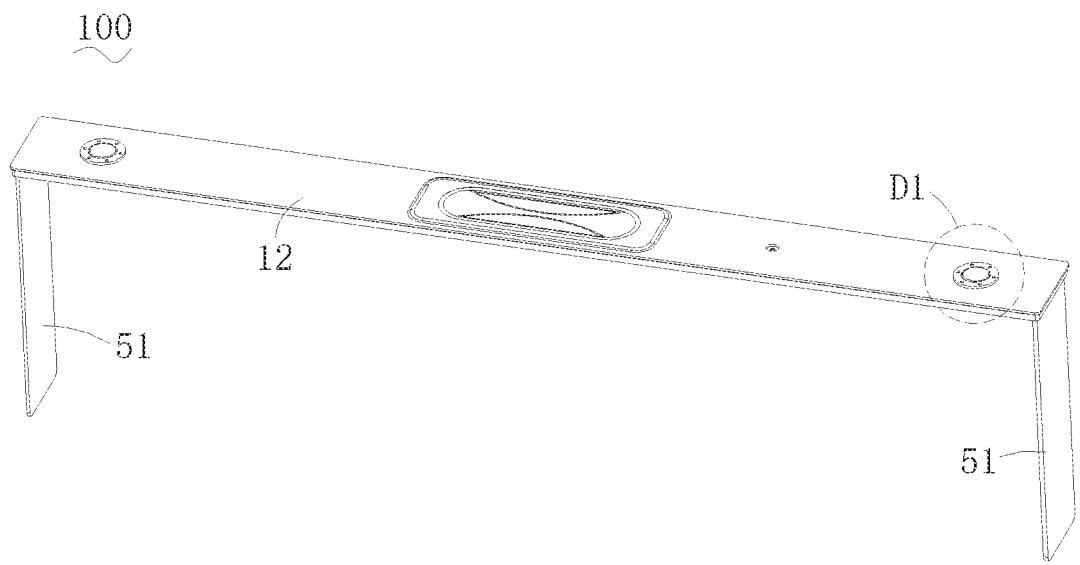
FIG. 26 is another perspective view of an end cover assembly according to an embodiment of the present disclosure.
Figure 27:
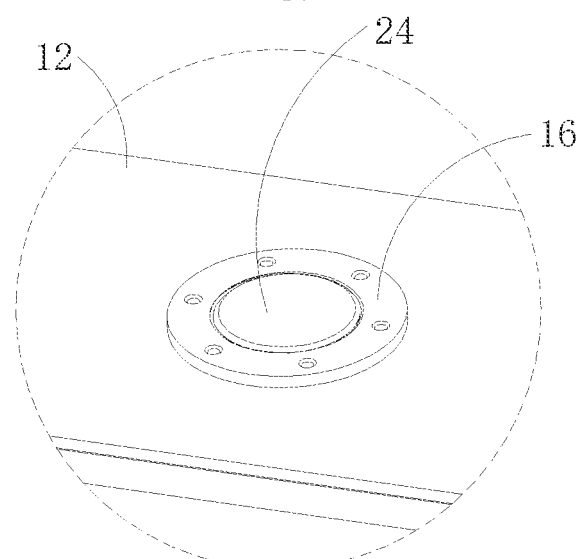
FIG. 27 is an enlarged view showing part D1 of the end cover assembly in FIG. 26.
Figure 28:
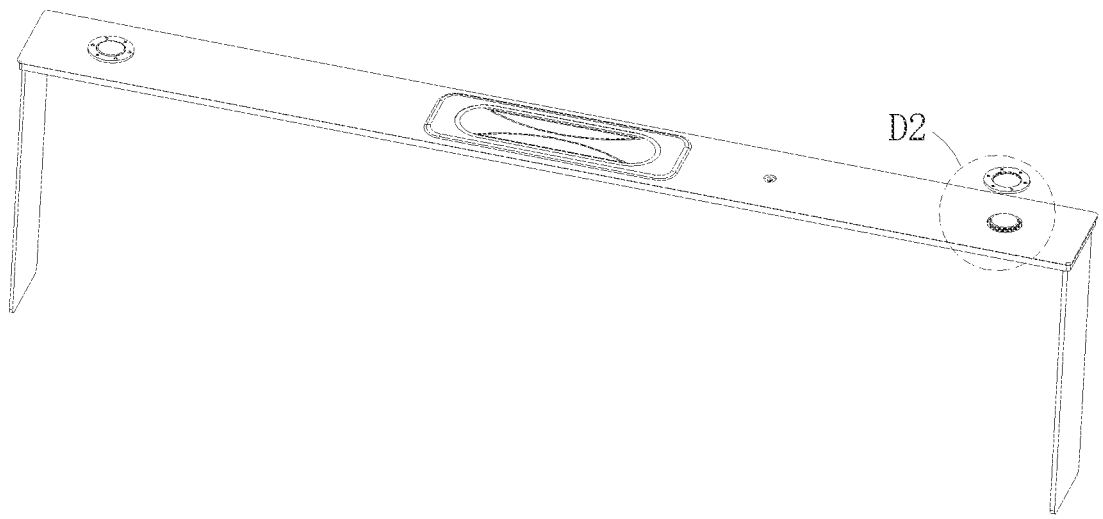
FIG. 28 is another partially exploded view of an end cover assembly according to an embodiment of the present disclosure.
Figure 29:
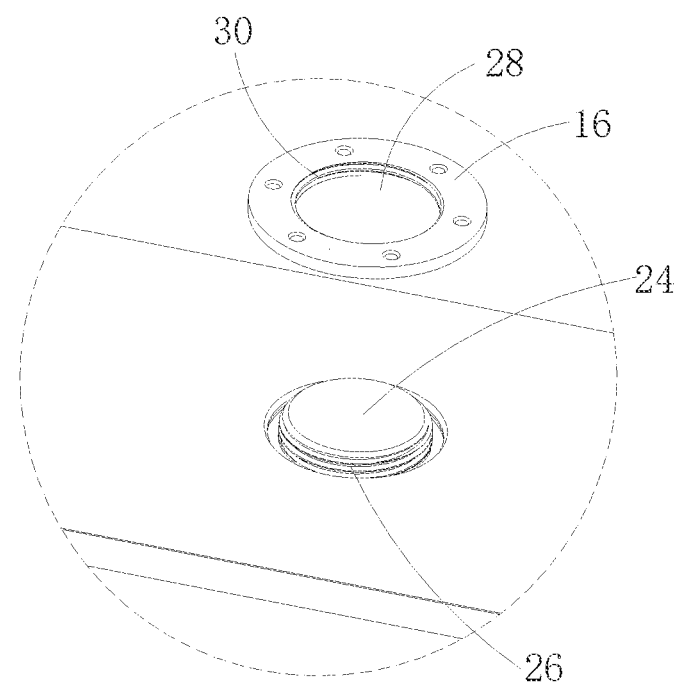
FIG. 29 is an enlarged view showing part D2 of the end cover assembly in FIG. 28.
Figure 30:
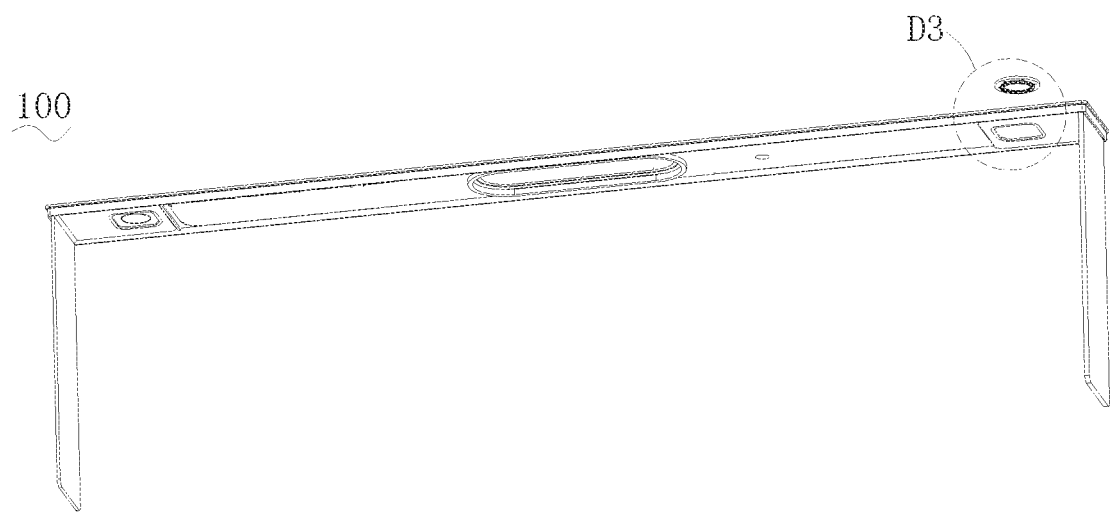
FIG. 30 is a partially exploded view of an end cover assembly according to an embodiment of the present disclosure.

In an exemplary embodiment of the present disclosure, the anti-loosing structure 18 may be formed as a ratcheting elastic-sheet anti-loosing structure. In FIG. 22, the first anti-loosening portion 32 includes a plurality of engagement grooves 74 arranged at intervals around the pole body 24 circumferentially. In FIG. 24 and FIG. 25, the second anti-loosing portion 34 includes a plurality of elastic sheets 76, and the insulator 16 includes a plastic member body 78 and a plastic member flange 80. The plastic member flange 80 is connected to an upper end of the plastic member body 78 and has a plurality of third through holes 82 arranged in a circumferential direction of the insulator 16. Each of the plurality of third through holes 82 has an elastic sheet 76 at an inner wall of the third through hole 82. The elastic sheet 76 includes an engagement portion 84 extending out of the third through hole 82. When the insulator 16 is mounted in place, the engagement portion 84 may be partially accommodated in the engagement groove 74, thereby preventing the insulator 16 from loosening, and thus high anti-loosening performance can be realized.

The engagement groove 74 has a first side surface 86 and a second side surface 88 opposite to each other. The first side surface 86 and the second side surface 88 are sequentially arranged in the clockwise direction. The second side surface 88 and the first side surface 86 are sequentially arranged in the loosening direction of the insulator 16. In another exemplary embodiment of the present disclosure, an inclination angle of the first side surface 86 relative to a vertical plane is smaller than an inclination angle of the second side surface 88 relative to the vertical plane. Therefore, resistance to a clockwise rotation of the insulator 16 is smaller than resistance to a counterclockwise rotation of the insulator 16.

In some embodiments, referring to FIG. 26 to FIG. 32, the cover plate 12 has a first surface 36 and a second surface 38 opposite to each other. The first through hole 20 penetrates the first surface 36 and the second surface 38. The first anti-loosing portion 32 includes an edge portion 89 of the cover plate 12 surrounding the first through hole 20. The insulator 16 has a third surface 90 and a fourth surface 92 opposite to each other. The fourth surface 92 is connected to the first surface 36. The second anti-loosing portion 34 includes a hook 94 connected to the fourth surface 92, and a hooking portion 96 of the hook 94 hooks the edge portion 89 to prevent the insulator 16 from loosening.

In this way, the insulator 16 can be prevented from loosening by hooking the hook 94 to the edge portion 89, and thus high anti-loosening performance can be realized. Meanwhile, metal debris can be avoided from being generated due to scratching between the insulator 16 and the cover plate 12, thus an internal short-circuit can be avoided.

In an exemplary embodiment of the present disclosure, the first surface 36 is an upper surface of the cover plate 12, and the second surface 38 is a lower surface of the cover plate 12. The third surface 90 is an upper surface of the insulator 16, and the fourth surface 92 is a lower surface of the insulator 16. The first surface 36 and the fourth surface 92 faces towards each other and abut with each other.

The hook 94 is provided at the fourth surface 92. The hooking portion 96 of the hook 94 hooks the edge portion 89 when the insulator 16 is mounted in place. When the insulator 16 rotates in the loosening direction, the insulator 16 tends to move upwards in the axial direction of the pole body 24. By hooking the hooking portion 96 of the hook 94 to the edge portion 89, the insulator 16 can be blocked from moving upwards, thereby preventing the insulator 16 from loosening.

During mounting of the insulator 16 into the pole body 24, the insulator 16 moves downwards. A lower end of the hook 94 moves into the first through hole 20 and slides along the hole wall of the first through hole 20. When being pressed by the hole wall of the first through hole 20, the hook 94 is deformed towards a center of the first through hole 20 to a certain extent. As the insulator 16 continues to be tightened, the hooking portion 96 of the hook 94 protrudes from the first through hole 20, and the hook 94 recovers from deformation. At this time, the hooking portion 96 hooks the edge portion 89 to prevent the insulator 16 from loosening.

Figure 31:
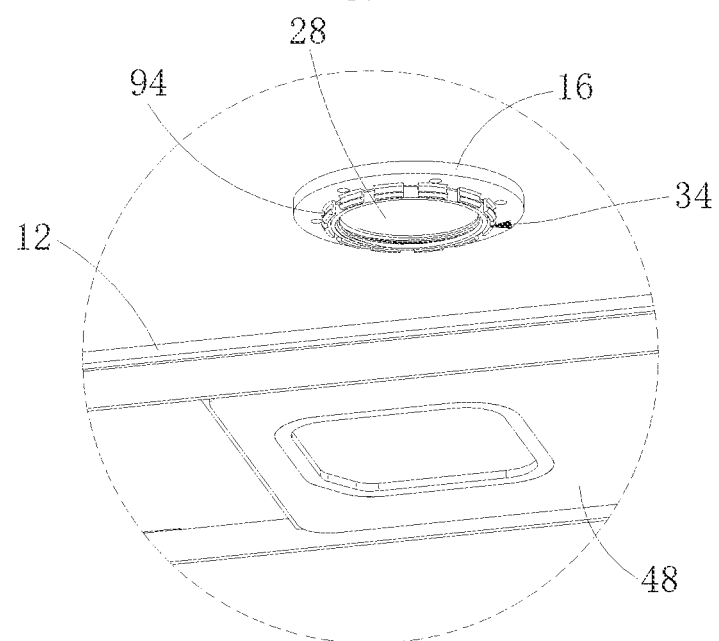
FIG. 31 is an enlarged view showing part D3 of the end cover assembly in FIG. 30.
Figure 32:
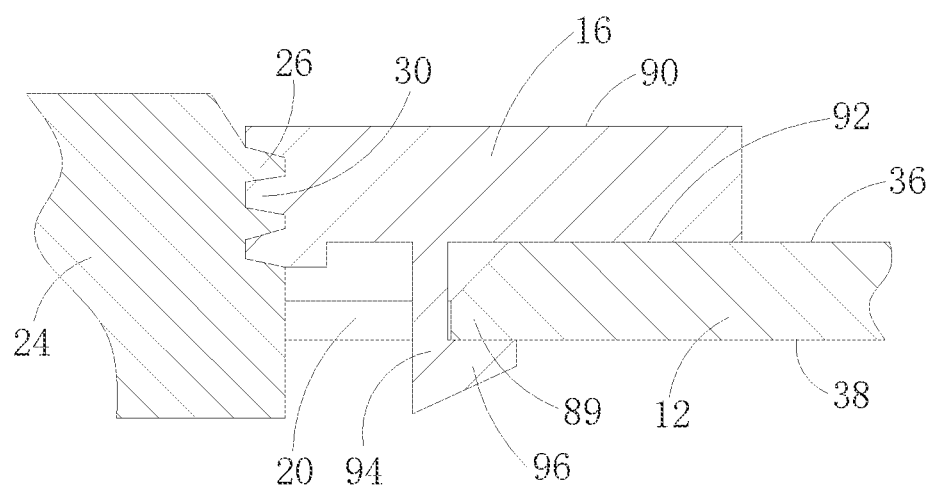
FIG. 32 is a partial sectional view of an end cover assembly according to an embodiment of the present disclosure.

In FIG. 31, a plurality of hooks 94 is arranged at intervals in the circumferential direction of the insulator 16 to further enhance the anti-loosening effect.

In some embodiments, the insulator 16 is of a cylindrical or polygon prism shape.

In this way, the insulator 16 may be adapted to different fastening tools.

In an exemplary embodiment of the present disclosure, in FIG. 1, the insulator 16 is of a cylindrical shape. The insulator 16 has a fastening hole 98 at the upper surface of the insulator 16, into which the fastening tool may be inserted to rotate the insulator 16.

Figure 4:
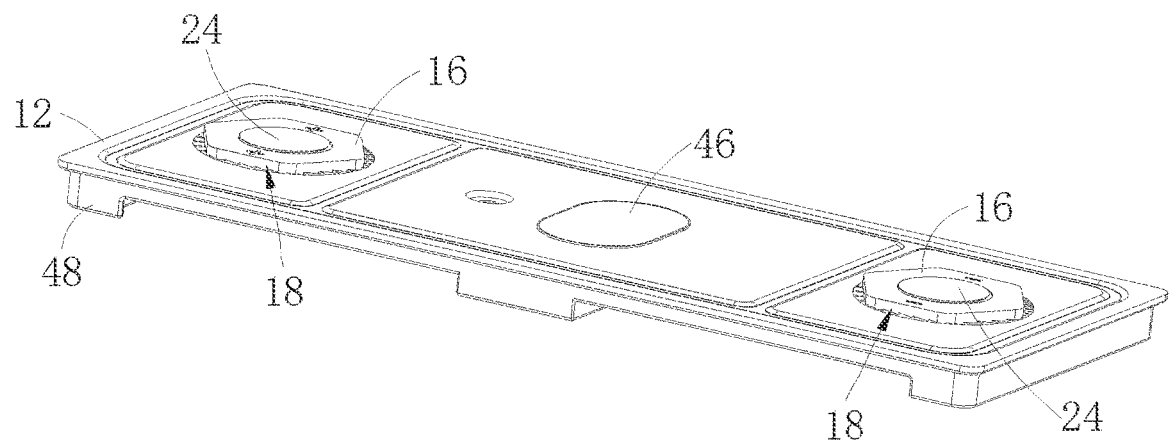
FIG. 4 is another perspective view of an end cover assembly according to an embodiment of the present disclosure.
Figure 5:
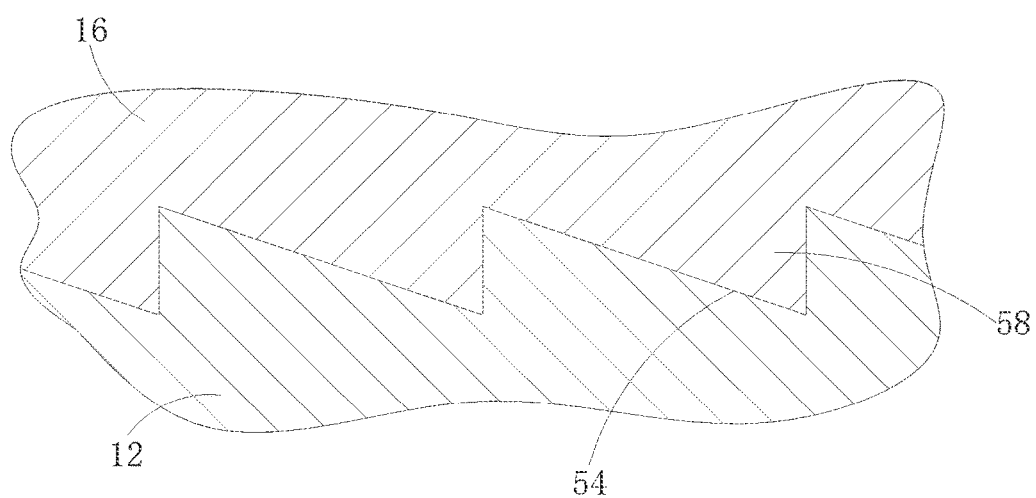
FIG. 5 is a schematic view showing a connection between an insulator and a cover plate according to an embodiment of the present disclosure.

In FIG. 4, the insulator 16 is of a hexagonal prism shape, which allows the fastening tool to be universal, and thus the insulator 16 has good structural strength. It should be understood that, in other embodiments, the insulator 16 is not limited to a hexagonal prism shape, and may also be of other polygonal prism shapes, such as a triangular prism shape, a quadrangular prism shape.

Figure 3:
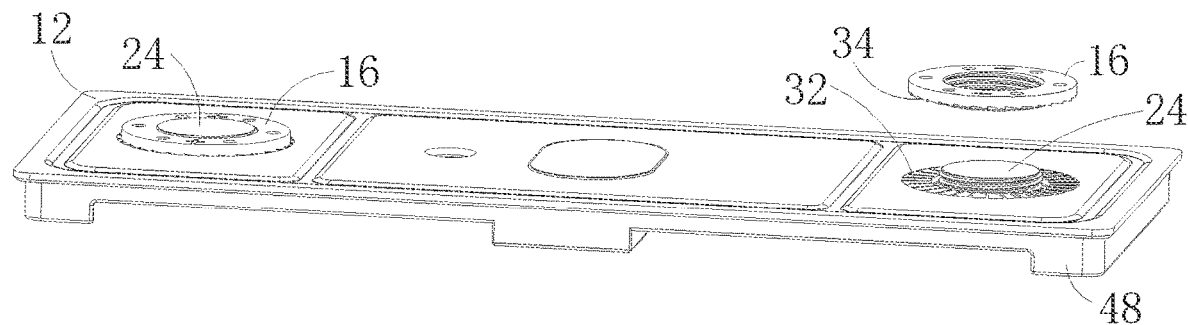
FIG. 3 is a partially exploded view of an end cover assembly according to an embodiment of the present disclosure.

In addition, in FIG. 3, the negative pole may further be formed through turning a copper-aluminum composite plate. In this case, the negative pole process has few steps and is easily controlled.

An energy storage device according to the embodiments of the present disclosure includes a battery cell. The battery cell includes the end cover assembly 100 according to any one of the embodiments described above.

In the energy storage device, the insulator 16 and the pole body 24 of the pole 16 are connected to the first thread 26 through the second thread 30. Therefore, without an injection molding overmolding process, a movement of the pole 14 towards an interior of a battery can be avoided. In addition, reliability of a connection between the insulator 16 and the pole body 24 of the pole 14 can be ensured by the anti-loosening structure 18.

In an exemplary embodiment of the present disclosure, the battery cell may further include a housing and an electrode plate. The housing internally has an accommodation cavity and an opening at a side of the housing. The opening is in communication with the accommodation cavity. The end cover assembly 100 is mounting at the opening to seal the accommodation cavity. The electrode plate is located in the accommodating cavity and includes a positive tab and a negative tab. The connection sheet 51 includes a positive connection sheet (at a left side) and a negative connection sheet (at a right side). The end cover assembly 100 includes a positive pole and a negative pole. The positive connection sheet is connected to the positive tab and the positive pole, and the negative connection sheet is connected to the negative tab and the negative pole.

The energy storage device may include one or more (two or more) battery cells. In one embodiment, a plurality of battery cells may be formed as a battery pack, and the plurality of battery cells may be electrically connected in series, parallel, or series-parallel. In one embodiment, a plurality of battery packs may be formed as a battery module, and the plurality of battery packs may be electrically connected in series, parallel, or series-parallel. In one embodiment, a plurality of battery modules may be mounted at a cluster rack to form a battery cluster. The plurality of battery modules may be electrically connected in series, parallel, or series-parallel.

An electric apparatus according to the embodiments of the present disclosure includes the energy storage device as described above, and the energy storage device is configured to supply power to the electric apparatus.

In the above-mentioned energy storage device and electric apparatus, the insulator and the pole body of the pole are connected to the first thread through the second thread. Therefore, without an injection molding overmolding process, a movement of the pole towards an interior of a battery can be avoided. In addition, reliability of a connection between the insulator and the pole body of the pole can be ensured by the anti-loosening structure.

In an exemplary embodiment of the present disclosure, the electric apparatus may include and not limited to a new energy vehicle, an unmanned aerial vehicle, an energy storage container, and the like.

In the description of this specification, descriptions with reference to the terms "an embodiment", "some embodiments", "certain embodiments", "illustrative embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials, or characteristics can be combined in any one or more embodiments or examples in a suitable manner.

Although embodiments of the present disclosure have been illustrated and described, it is conceivable for those skilled in the art that various changes, modifications, replacements, and variations can be made to these embodiments without departing from the principles and spirit of the present disclosure. The scope of the present disclosure shall be defined by the claims as appended and their equivalents.

What is claimed is:

1. An end cover assembly, comprising:
   a cover plate having a first through hole;
   a pole comprising a pole body, the pole body passing through the first through hole and provided with a first thread at an outer peripheral surface of the pole body;
   an insulator provided on the cover plate and having a second through hole, the second through hole having a hole wall provided with a second thread, the pole body passing through the second through hole, and the first thread being connected to the second thread;
   an anti-loosening structure comprising a first anti-loosening portion and a second anti-loosening portion that are engaged and connected with each other to prevent the insulator from loosening, wherein:
   the first anti-loosening portion is disposed at the outer peripheral surface of the pole body, and the second anti-loosening portion is disposed at the hole wall of the second through hole;
   the first anti-loosening portion comprises one of a groove and a protrusion, and the second anti-loosening portion comprises another one of the groove and the protrusion, the protrusion extending in a radial direction of the pole body and being at least partially located in the groove to prevent the insulator from loosening;
   the first anti-loosening portion is disposed at a top peripheral edge of the pole body, and the first thread is located below the first anti-loosening portion;
   the second anti-loosening portion is disposed at a top peripheral edge of the second through hole, and the second thread is located below the second anti-loosening portion;
   the insulator has two operating holes, the end cover assembly being configured to allow a tool to be inserted into the two operating holes to deform outwards the insulator, separating the protrusion from the groove.

2. The end cover assembly according to claim 1, wherein the insulator is of a cylindrical or polygon prism shape.

3. An energy storage device, comprising a battery cell, wherein the battery cell comprises the end cover assembly according to claim 1.

4. The energy storage device according to claim 3, wherein the insulator is of a cylindrical or polygon prism shape.

5. An electric apparatus, comprising the energy storage device according to claim 3, wherein the energy storage device is configured to supply power to the electric apparatus.

6. The electric apparatus according to claim 5, wherein the insulator is of a cylindrical or polygon prism shape.

\* \* \* \* \*